May 12, 1970

J. L. SCHNETTLER 3,511,321

HAMMER DRILL

Filed Sept. 4, 1968

Inventor
Jerome L. Schnettler
By Gerrit D. Foster
Attorney

United States Patent Office 3,511,321
Patented May 12, 1970

3,511,321
HAMMER DRILL
Jerome L. Schnettler, Milwaukee, Wis., assignor to Milwaukee Electric Tool Corporation, Brookfield, Wis., a corporation of Wisconsin
Filed Sept. 4, 1968, Ser. No. 757,330
Int. Cl. E02d 7/02
U.S. Cl. 173—48                                    6 Claims

ABSTRACT OF THE DISCLOSURE

A hammer drill with a quick acting ball locked shift spacer to hold the spindle in nonhammering rotating position and a heat insulator between the ratchets and the motor casing and motor.

BACKGROUND OF THE INVENTION

Field of the invention

This invention relates to a portable electrically driven tool, particularly a hammer drill, which is designed to provide hammering with rotation or rotation only. When in the position for hammering with rotation the hammering is effected by pressure supplied by the operator which permits engagement between a fixed and rotating ratchet. To permit rotation without hammering a thrust bearing is placed in operative position and locked in such position by a quick acting ball and shift collar lock. The pressure supplied by the operator will be carried by this thrust bearing and the ratchets will be held out of engagement.

The ratcheting which produces the hammering also generates a lot of heat which must be insulated from the gear case, motor housing and handle. Another aspect of this invention therefore is the provision of a spacer of plastic material of high tensile strength, good shock absorption, and poor thermal conductivity. Such spacer also forms a structural element which supports the spindle, chuck, ratchets, and ratchet control.

Description of the prior art

The most pertinent prior art are United States Pats. 2,942,852, and 3,119,274.

Both of these show a fixed ratchet in the housing and a rotating ratchet operated by the chuck spindle. When the operator presses on the housing the ratchets are brought into engagement. Both have thrust bearings effective for drilling only when in non-impacting position.

In 2,942,852 a threaded collar is manually rotated to vary the distance between the teeth on the fixed ratchet and the teeth on the rotating rachet allegedly to regulate the percussion amplitude between no percussion and full percussion.

In 3,119,274 the transfer of rotational power to the spindle while permitting axial movement is obtained by a separate component in the form of a splined coupling. The thrust bearing in this patent is also a separate component. The shifting from drill and hammer to drill only is accomplished by rotation of an adjusting collar.

In both these patents the adjustment is relatively slow and not positive. Both effect the ultimate result by the use of separate and relatively expensive components.

Neither of these patents show any means of heat insulating the ratchets from the motor, motor housing and handle.

SUMMARY OF THE INVENTION

The essence of this invention is the use of: (1) a quick sliding shift collar which locks balls to either hold or free a shift spacer; (2) such shift spacer comprising one face of a thrust bearing; (3) an elongated pinion for driving the spindle and spindle gear which permits relative axial movement of the spindle during operating conditions thereby eliminating a splined coupling member; and (4) a plastic structural element to heat insulate the ratchets from the gear case, motor, motor housing and handle.

DESCRIPTION OF THE PREFERRED EMBODIMENT

Figure 1:
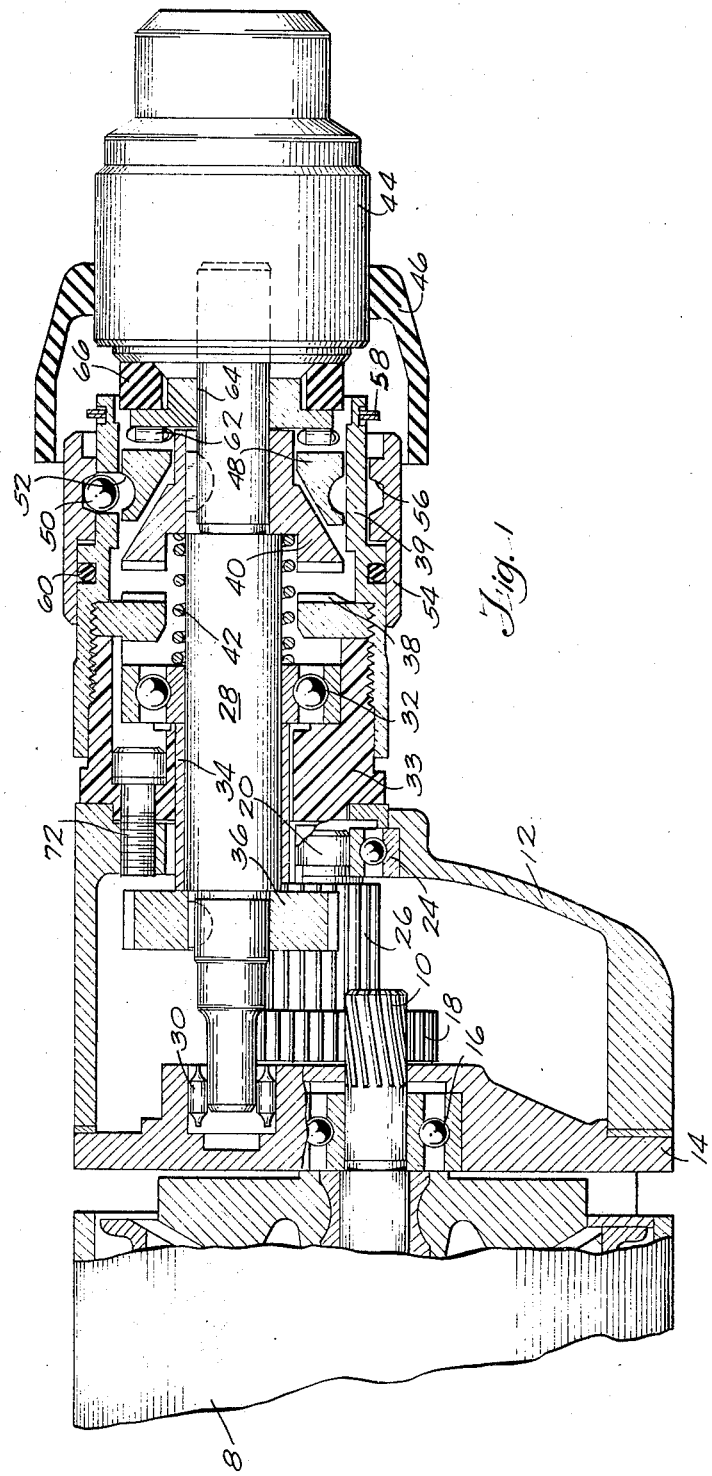
FIG. 1 is a fragmentary view partly in longitudinal meandering vertical section through a hammer drill embodying the present invention and partly in plan view.

Referring to the drawing by reference numerals the hammer drill embodying this invention is driven by a conventional electric motor controlled by the customary trigger type switch and mounted in a motor housing 8. The usual pistol handle grip is secured to the motor housing. A drive shaft 10 extends from the motor housing to which is connected the gear drive, ratchet mechanism and hammering control embodying this invention.

The gear drive is carried in a gear case 12 mounted on a diaphragm 14 attached to the motor housing 8. The shaft 10 is rotatably supported by a ball bearing 16 fixed in such diaphragm. The forward end of such shaft is formed to provide a driving gear which meshes with an intermediate gear 18. This intermediate gear is carried on an offset shaft 20 mounted in a needle bearing (not shown) carried by diaphragm 14 and by a ball bearing 24 carried by the gear case 12. The forward end of the shaft 20 is formed to provide an elongated intermediate pinion 26.

A spindle 28 has its inner end of reduced diameter mounted in needle bearing 30 carried by the diaphragm 14 and its enlarged diameter central portion mounted in ball bearing 32 carried by a plastic spacer 33 secured to the gear case 12. The outer race of this bearing is fixed in such spacer 33 and the spindle is slidable axially with respect to the inner race. As shown, the spindle is at its outermost position and maintained against further outward movement by spindle spacer 34 fixed to the spindle.

As can be understood by those skilled in this art and as shown by the meandering section line, the axis of the spindle 28 is placed above and in the same vertical plane as the axis of drive shaft 10. The axis of the shaft 20 is positioned above and to the rear, as viewed, of the axis of the drive shaft 10. This explains why the needle bearing for shaft 20 is not shown and ball bearing 24 is only partially shown in the meandering sectional view.

One essential component of this invention is a drive coupling for the spindle 28 which will permit limited axial movement of such spindle. In this invention it is accomplished by using the elongated intermediate pinion 26 and a spindle gear 36 which will slide along the pinion 26 while transmitting rotative power. The spindle gear 36 is fixedly mounted on the spindle 28 as shown. It will slide rearward with respect to the pinion 26 when the spindle is released as hereinafter described for hammering action. Thus there is eliminated the separate component for permitting such relative sliding motion usually present in hammer drills.

The hammering action is accomplished by the interaction between a fixed ratchet 38 engaged between the end of spacer 33 and a sleeve 39 threaded on such spacer, and a rotating ratchet 40 fixedly mounted on the reduced diameter outer end of the spindle 28. The ratchet spring 42 normally urges the spindle 28 and fixed ratchet 40 outwardly of the tool. However when the operator presses the tool toward the work this spring will compress and the ratchets will engage. The force of the resulting hammering will be dependent upon and controlled by the pressure exerted by the operator. The chuck 44 of standard design carried on the outer end of spindle 28 receives and holds drills and special bits. The usual dust shield 46 is applied.

When it is desired to drill without hammering a shift spacer 48 mounted within the sleeve 39 is locked in place in the axial position shown by balls 50 which engage a groove 52 in spacer 48 as such balls (only one of three shown) are forced radially inwardly by sliding a shift collar 54 forwardly (to the right as shown). The sides of an internal groove 56 in such shift collar will cam such balls into locking position. The forward limit of the movement of the shift collar is set by a retaining ring 58 seated in a groove at the end of the sleeve 39. An O-ring 60 provides sufficient friction to hold the shift collar in either the unlocking position shown or a forward locked position. When the shift spacer is locked the thrust from the tool to a bit in the chuck is transmitted by a needle thrust bearing 62 between the forward face of the shift spacer 48 and the rear face of thrust spacer 64 fixed to the spindle 28. A spindle seal 66 of usual design may be employed. A principal advantage of this sliding shift collar with the ball locked shift spacer is the speed with which positive change from hammering to nonhammering action can be accomplished. Other advantages are the ease of manufacture and assembly, the easy replacement of worn parts, and lower manufacturing costs.

Figure 2:
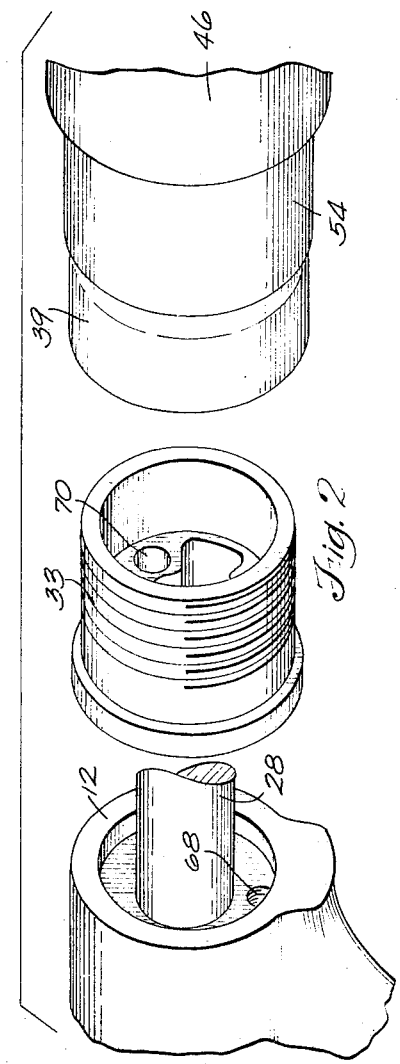
FIG. 2 is an exploded view in perspective showing the heat insulating structural member.

During ratcheting action temperatures at the sleeve 39 in which the fixed ratchet 38 is mounted may become as high as 250° F. If this heat at this area is conducted to the motor housing 8 without the blocking of a heat insulating member, temperatures in the neighborhood of 145° F. might be reached. This is dangerous to motor operation and very inconvenient for the operator. Consequently this invention incorporates as a structural part the heat insulating spacer 33 which is shown in FIG. 2. This spacer has a projection on its left hand end fitted into a recess on the right hand end of the gear case and held there by machine screws 72 passing through openings 70 on the wall of the spacer and screwed into threaded openings 68 in the gear case 12. The spacer 33 has an externally threaded end on which the internally threaded end of the sleeve 39 is mounted; an internal shoulder on such sleeve coacts with the end of spacer 33 to grip and hold the fixed ratchet 38 therebetween.

The spacer 33 thus is a structural element which mounts the sleeve and fixed ratchet and holds the ball bearing 32 for supporting the spindle. The spacer 33 is formed from a plastic material with high tensil strength, good shock absorption, high impact strength, and relatively poor thermal conductivity. It may be injection molded using polysulfone (black) as the plastic. Alternative plastics which may also be used are nylon or polycarbonates and possibly others. When the spacer 33 of this material is used the heat at the motor housing 8 was reduced from 145° F. to below 115° F. (115° F. is considered a safe upper limit).

I claim:
1. A hammer drill for drilling or impact drilling comprising:
 a motor housing adapted to be supported by an operator, a motor within said housing having a drive shaft;
 a gear case secured to said motor housing, gear drive means in said case connected to said drive shaft and adapted to be coupled with a spindle;
 a spindle holding sleeve mounted on said gear case, a spindle having one end rotatably mounted in said gear case and the other end projecting outwardly of said sleeve and adapted to mount a chuck, bearing means in said sleeve for said spindle permitting said spindle to have axial movement;
 coupling means between said gear drive means and said spindle for transmitting rotational power and permitting axial movement of said spindle;
 hammering means consisting of a ratchet fixedly mounted on said sleeve and a cooperating ratchet fixedly mounted on said spindle, said ratchets being in hammer producing contact when said spindle is moved axially inwardly as said hammer drill is moved by operator force toward the work;
 releasable thrust means active when in locked position to prevent inward axial movement of said spindle to keep said ratchets out of hammer producing contact; and
 means operable solely by sliding for locking said thrust means in locked position.

2. A hammer drill as set forth in claim 1 wherein said coupling means consists of:
 an elongated gear in said gear drive means; and
 a gear on said spindle having a speed reduction ratio with respect to and in engagement with said output gear, and slidable axially with respect thereto.

3. A hammer drill as set forth in claim 1 wherein:
 a heat insulating spacer is secured to said gear case and provides a support for said spindle holding sleeve.

4. A hammer drill as set forth in claim 3 wherein:
 said heat insulating spacer consists of molded plastic material of high tensil strength, good shock absorption, high impact strength, and relatively poor thermal conductivity.

5. A hammer drill as set forth in claim 3 wherein:
 said heat insulating spacer consists of molded plastic material taken from the group of polysulfone, nylon, or polycarbonates.

6. A hammer drill for drilling or impact drilling comprising:
 a motor housing adapted to be supported by an operator, a motor within said housing having a drive shaft;
 a gear case secured to said motor housing, gear drive means in said case connected to said drive shaft and adapted to be coupled with a spindle;
 a heat insulating spacer secured to said gear case providing a support for a spindle holding sleeve;
 a spindle holding sleeve mounted on said heating insulating spacer, a spindle having one end rotatably mounted in said gear case and the other end projecting outwardly of said sleeve and adapted to mount a chuck, bearing means in said spacer for said spindle permitting said spindle to have axial movement;
 coupling means between said gear drive means and said spindle for transmitting rotational power and permitting axial movement of said spindle;
 hammering means consisting of a ratchet fixedly mounted between said spacer and said sleeve and a cooperating ratchet fixedly mounted on said spindle, said ratchets being in hammer producing contact when said spindle is moved axially inwardly as said hammer drill is moved by operator force toward the work.

References Cited

UNITED STATES PATENTS

| 1,356,556 | 10/1920 | Payne | 173—48 |
| 2,942,852 | 6/1960 | Muthmann | 173—109 |
| 3,080,008 | 3/1963 | Hendrickson | 173—109 |
| 3,119,274 | 1/1964 | Short | 173—48 |

JAMES A. LEPPINK, Primary Examiner

U.S. Cl. X.R.

173—90, 109, 171